Jan. 10, 1950 F. H. RICHTERKESSING 2,494,409
TROLLEY FROG-SWITCH
Filed April 22, 1946 2 Sheets-Sheet 1
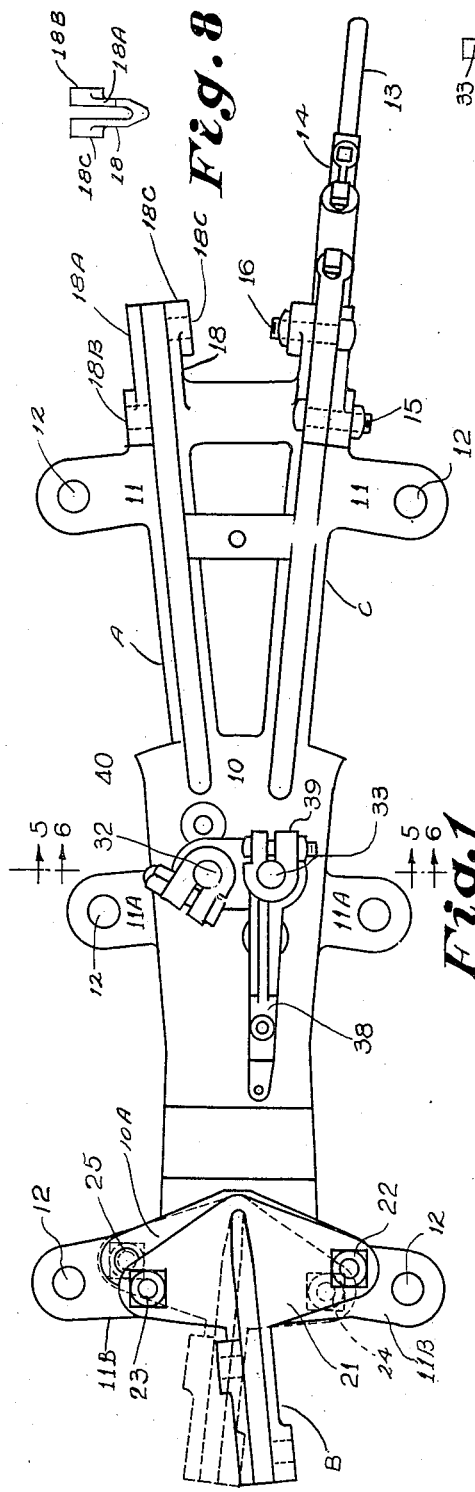
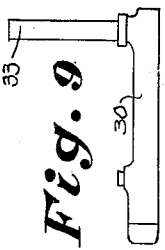
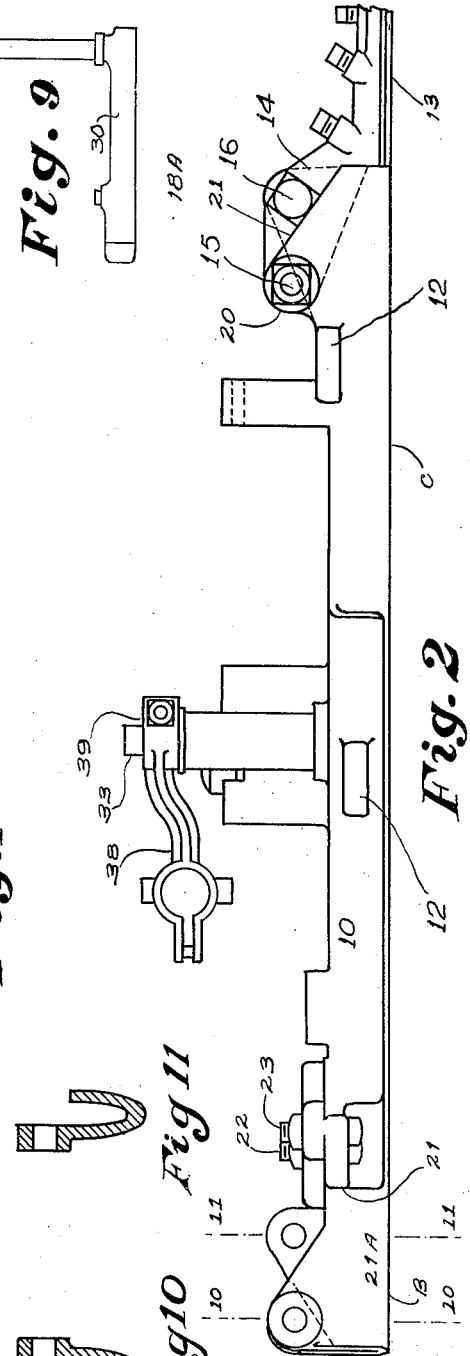
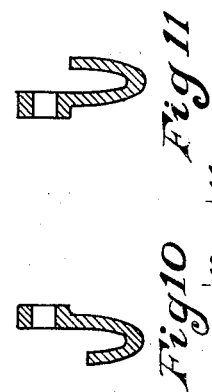
INVENTOR
FRANK H. RICHTERKESSING
BY John L. Milton
ATTORNEY Jan. 10, 1950     F. H. RICHTERKESSING     2,494,409
TROLLEY FROG-SWITCH
Filed April 22, 1946                                2 Sheets-Sheet 2
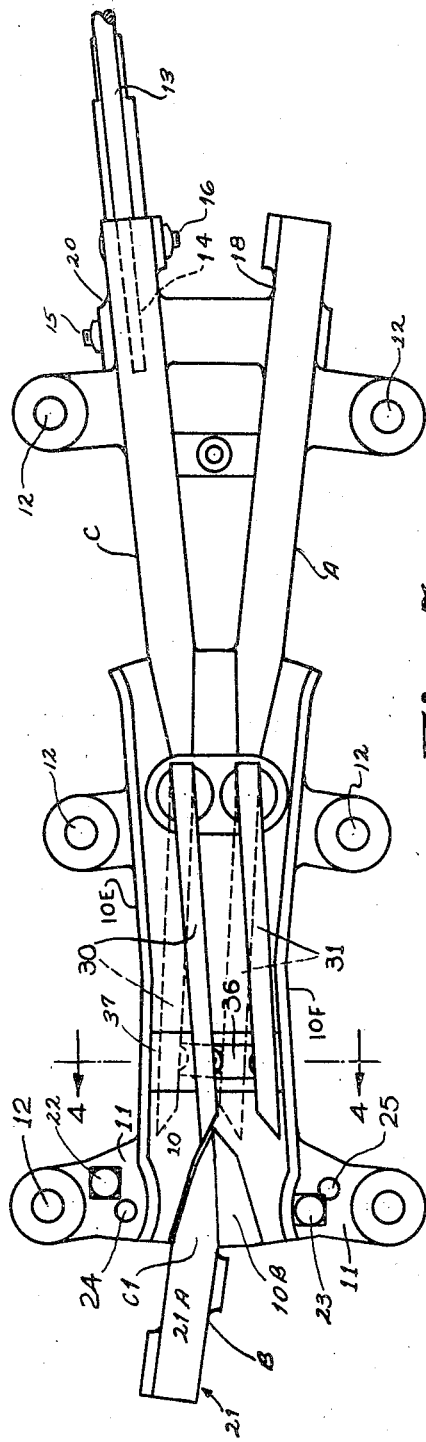
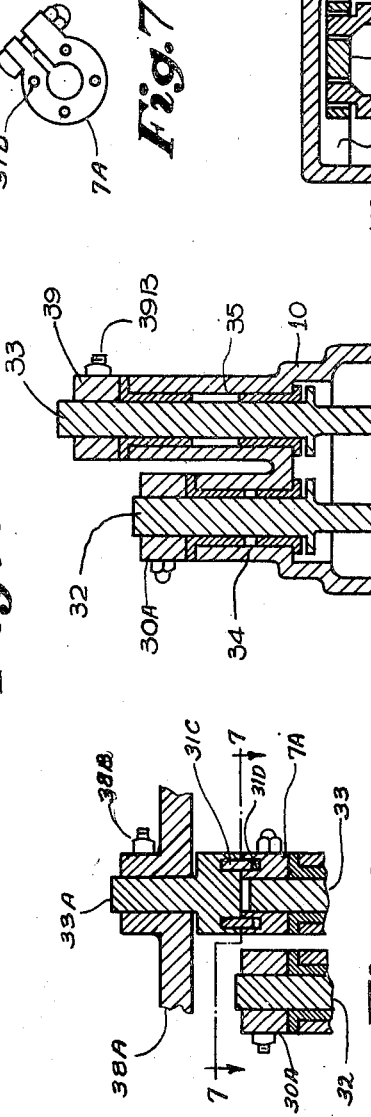
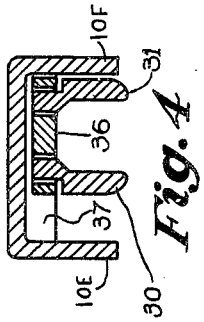
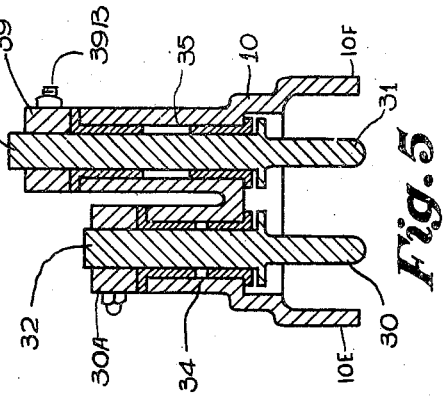
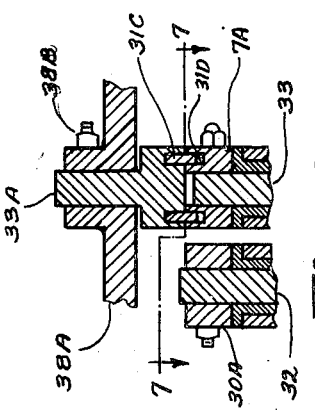
INVENTOR
FRANK H. RICHTERKESSING
BY
John L. Milton
ATTORNEY Patented Jan. 10, 1950

2,494,409

UNITED STATES PATENT OFFICE 2,494,409

TROLLEY FROG SWITCH

Frank H. Richterkessing, Louisville, Ky., assignor to Cheatham Electric Switching Device Co., Incorporated, Louisville, Ky., a corporation of Kentucky Application April 22, 1946, Serial No. 664,060

3 Claims. (Cl. 191—38)

The present invention relates to overhead trolley frog-switches that guide trolley collectors, whether of the wheel or shoe type, in a selected or predetermined path as the electric vehicle on which the collector is mounted travels over the straight or a turnout course. This has reference to vehicles of both dirigible and rail types.

One of the principal objects of the invention is to provide a frog-switch body structure and the auxiliary parts thereof with features that have inherent properties that contribute to use over a much longer period than found in similar devices known heretofore.

Another object of my invention is to provide a universal adjustable trolley frog-switch wherein the main body is constructed with only the more enduring or permanent portions as a unit while those members that are necessarily subjected to the greatest mechanical and electrical abrasion, thereby requiring replacement oftener than the main body, can be replaced independently of one another without disturbing the said switch body after the complete trolley frog-switch has been installed for selectively directing trolley collectors.

Other objects and advantages will appear as a description of the physical embodiments selected to illustrate the several elements of my invention progresses and the novel features will be particularly pointed out in the appended claims.

My invention resides in the new and novel construction, the combination and relation of the various parts described and disclosed in the accompanying drawings, showing a commercial embodiment:

Figure 1 is a top plan view of my complete trolley frog-switch and ready for installation as part of a trolley system.

Figure 2 is a side elevational view of Fig. 1. These two figures also show structure for receiving electrical operating apparatus as shown in my U. S. Patent No. 2,268,962.

Figure 3 is a plan view of the underneath or obscured side of Fig. 1 as it would appear when looking upwardly.

Figure 4 is a sectional view of Fig. 1 along with line 4—4 of Fig. 3.

Figure 5 is a sectional elevational view along line 5, 6—5, 6 of Fig. 1.

Figure 6 is a modification of the top portion of Fig. 5, also in sectional elevation.

Figure 7 is a view along line 7—7 of Fig. 6 to show the top face of clamp 7A.

Figure 8 is an elevation on reduced scale of face 18A of the right hand extremity of arm A.

Figure 9 is a side elevation of tongue 30.

Figures 10 and 11 show sections along lines 10—10 and 11—11 respectively of Fig. 2.

The elongated body member designated by numeral 10 is preferably formed of cast material, such as malleable bronze, with integral flanges 10E, 10F and channeled arms or runners A and C, each having an integral ear 11 that terminate in eyes 12 for receiving a "guy" or supporting span wire. These wires, not shown in the drawings, are in turn secured to poles or buildings according to conventional practice for locating the frog-switch for use. Similar ears 11A and 11B with eyes 12 also project from body 10 for receiving supporting wires.

Arms A and C of body 10 and arm B integral with adjustable separable bracket 21 secured to the body by bolts 22—23 are each fashioned to receive an ear of the type shown by numeral 14. This ear functions for securing the end of a trolley wire thereto.

The outer end portions of channelled arms A and B are shown in Figs. 1, 2 and 3 without having an ear attached thereto while arm C is shown with ear 14 secured in place. These end portions are similarly formed consequently a description of the plan view of the end portion of arm A and the elevational view of the end portion of arm B together with cross sectional view thereof shown in Figs. 10 and 11 will suffice for the specific structure common to all of said end portions. Hole 18B in one lip of the grooved arm and hole 18C in the other lip are provided for receiving bolts identical with 15 and 16 shown secured to arm C where it can be noted that the inside faces of the heads of these bolts are in direct contact with juxtaposed vertical parallel faces of ear 14, thereby forcing the opposite faces of said ear in direct contact with inner faces of the groove thereby insuring a perfect electrical contact between the ear and arm without springing the lips of the arm in which case there would be a potential bias tending to spring the contact faces apart. Attention is called to the feature wherein one tangential face of each bolt head is lodged against an inclined plane of the opposite lip through which the other bolt passes, thereby eliminating the necessity of employing a wrench for holding the bolt while the nut is advanced to a clamping position or when the bolt is removed for replacing the ear. This feature is of particular advantage for the maintainer since it frees one hand when the ear is installed or replaced.

A side elevation of ear 14 is shown in full and broken lines in Fig. 2 while the top view is shown in full lines in Fig. 1. These figures both show the end of conductor grooved trolley wire 13 secured thereto by conventional means.

In Figs. 1 and 3, bracket 21 shown in full lines is disposed on boss 10A at an angle approximately 12 degrees in terms of the longitudinal axis of body 10 while in Fig. 1 this bracket is also shown in dotted lines to indicate it having been moved to a position of approximately 12 degrees the other side of the longitudinal axis of body 10. This shifting of the bracket from the full line to the dotted line position can be accomplished by removing bolts 22 and 23 from the holes they are shown to occupy in the body member. After shifting the bracket the bolts are passed through the other set of holes, these bolts 23, 22 are then passed through holes 24, 25, respectively, and secured. It should be noted that opening 10B in body member 10 has been provided to afford clearance for the pointed end C1 of the tongue depending from arm B to extend inwardly for alignment with runners 30 and 31.

The renewable feature, just explained, is one of the elements incorporated in my trolley frog-switch that enables the main body portion to be retained in service over an unusually long period of use since approach tongue 21A or its equivalent arm of all frogs is subjected to excessive mechanical and electrical erosion. Obviously the unit can be adjusted for either a right hand or a left hand frog by the maintainer either at the outset or subsequent to the initial installation.

Fig. 5 shows tongues 30 and 31 as depending from shafts 32, 33 respectively mounted in bearings 34, 35, vertically disposed in body member 10. The remote free ends of these tongues are pivoted to link or yoke 36 that travels in recess 37, shown in Figs. 3 and 5. Power for operating these tongues is applied to lever 38 that is secured by means of clamp 39 and bolt 39B to the projecting end of shaft 33. A similar clamp 30A is attached to the projecting end of shaft 32 which serves as a collar to retain the tongue 30 in its operating position.

As actuating power is applied to arm 38, tongue 31 is moved either to the solid or the dotted line position, shown in Fig. 3. Since tongue 30 is pivotally attached to tongue 31 by means of link 36, tongue 31 will also be maintained in parallel relation to the former end moved in unison therewith.

The modification shown in Figs. 6 and 7 may be used where it is desired to make provision for renewing operating lever 38A without removing tongue 31. By using clamp 7A attached to the top end of shaft 33 the tongue 31 is held in position when shaft extension 33A to which operating lever 38A is attached by bolt 38B. The lower end of extension 33A is equipped with four pins 31C organized for alignment with holes 31D in the top face of clamp 7A.

While I have shown and described a preferred commercial embodiment of my invention, I desire it to be understood that changes may be effected thereon without departing from its spirit and scope as set forth in the appended claims.

I claim:

1. A trolley frog-switch for a current collector comprising a body-member having a pair of angularly disposed runners integral therewith and a separate longitudinally spaced runner adjustably mounted on said body-member for guiding a current collector carried by a vehicle onto and off the said switch; two pivoted guide tongues operatively associated with the runners for guiding a collector from the adjustable runner to one of the other runners as determined by the position of one of said tongues; each tongue having a shaft and bearing in said body with the axis thereof disposed adjacent the end of a runner and in axial alignment with the longitudinal axis of the runner with which it is associated, said tongue being provided with means for receiving an operating force.

2. A trolley frog-switch for a current collector comprising in combination a body-member having a pair of angularly disposed runners integral therewith and a separate longitudinally spaced runner depending from a bracket adjustably secured to said body-member for guiding a current collector onto and off the said switch; two pivoted guide tongues operatively associated with the runners for guiding a collector carried by a vehicle from the adjustable runner to one of the other runners as determined by the position of one of said tongues; each tongue having at one end thereof a shaft pivoted in said body and at the other end pivotal means operatively associated with a link for transmitting an operating force from one tongue to the other.

3. A trolley frog-switch for a current collector comprising a body-member having longitudinally disposed flanges depending therefrom and a plurality of longitudinally spaced runners for guiding a current collector onto and off the said switch; two guide tongues disposed within said flanges and pivoted at one end thereof in said body member and operatively associated with the runners for guiding a collector carried by a vehicle from an approach runner to a leaving runner as determined by the position of said tongues; each tongue having at the other end thereof pivotal means disposed within said flanges and operatively associated with a link also disposed within said flanges for transmitting an operating force from one tongue to the other.

FRANK H. RICHTERKESSING.

REFERENCES CITED

The following references are of record in the file of this patent:

UNITED STATES PATENTS

| Number | Name | Date |
| --- | --- | --- |
| 525,598 | Greenwood | Sept. 4, 1894 |
| 569,972 | Langen | Oct. 20, 1896 |
| 2,288,681 | Chandler | July 7, 1942 |
| 2,299,914 | Matthes | Oct. 27, 1942 |